United States Patent
Ueno et al.

(10) Patent No.: US 12,423,173 B2
(45) Date of Patent: Sep. 23, 2025

(54) VIRTUALIZED SYSTEM FAULT ISOLATION DEVICE AND VIRTUALIZED SYSTEM FAULT ISOLATION METHOD

(71) Applicant: Nippon Telegraph and Telephone Corporation, Tokyo (JP)

(72) Inventors: Masaki Ueno, Musashino (JP); Noritaka Horikome, Musashino (JP); Kenta Shinohara, Musashino (JP)

(73) Assignee: NTT, Inc., Tokyo (JP)

( * ) Notice: Subject to any disclaimer, the term of this patent is extended or adjusted under 35 U.S.C. 154(b) by 27 days.

(21) Appl. No.: 18/571,774

(22) PCT Filed: Jun. 29, 2021

(86) PCT No.: PCT/JP2021/024529
§ 371 (c)(1),
(2) Date: Dec. 19, 2023

(87) PCT Pub. No.: WO2023/275985
PCT Pub. Date: Jan. 5, 2023

(65) Prior Publication Data
US 2024/0289205 A1    Aug. 29, 2024

(51) Int. Cl.
G06F 11/00    (2006.01)
G06F 9/455    (2018.01)
G06F 11/07    (2006.01)

(52) U.S. Cl.
CPC ........ G06F 11/079 (2013.01); G06F 9/45558 (2013.01); *G06F 2009/45583* (2013.01)

(58) Field of Classification Search
CPC ............. G06F 11/1423; G06F 11/0712; G06F 11/1443
See application file for complete search history.

(56) References Cited

U.S. PATENT DOCUMENTS

2015/0033072 A1*  1/2015  Barr .................... G06F 11/1484
714/15

FOREIGN PATENT DOCUMENTS

CN    111414229    7/2020

OTHER PUBLICATIONS

Kubernetes.io [online], "Liveness Probe. Using Readiness Probe and Startup Probe," available on or before Oct. 2020, retrieved on Aug. 2020, retrieved from URL<https://kubernetes.io/ja/docs/tasks/configure-pod-container/configure-liveness-readiness-startup-probes/>, 15 pages (with machine translation).

* cited by examiner

*Primary Examiner* — Jason B Bryan
(74) *Attorney, Agent, or Firm* — Fish & Richardson P.C.

(57) ABSTRACT

A calculation resource cluster that is virtually created on a physical machine by container virtualization software and in which containers virtually created on the physical machine by the container virtualization software are clustered and arranged; and a cluster management unit that is virtually created and manages control related to arrangement and operation of the containers clustered. Further, included are: an abnormality detection unit that is created at an outside of the calculation resource cluster and the cluster management unit that are virtually created and detects an abnormality in the containers; and an abnormality handling unit that is created at the outside and transmits, to the cluster management unit, a command for giving an instruction to stop an abnormal container detected by the abnormality detection unit. The cluster management unit stops the abnormal container in response to the command.

6 Claims, 13 Drawing Sheets

VIRTUALIZED SYSTEM FAULT ISOLATION DEVICE AND VIRTUALIZED SYSTEM FAULT ISOLATION METHOD

CROSS-REFERENCE TO RELATED APPLICATIONS

This application is a National Stage application under 35 U.S.C. § 371 of International Application No. PCT/JP2021/024529, having an International Filing Date of Jun. 29, 2021, the disclosure of which is considered part of the disclosure of this application, and is incorporated by reference in its entirety into this application.

TECHNICAL FIELD

The present invention relates to a virtualization system failure separation device and a virtualization system failure separation method that implement abnormality detection and failure recovery for a container or an application operating on the container in a virtual machine or a computing base based on the container.

BACKGROUND ART

The virtual machine described above is a computer that implements the same functions as those of a physical computer by software. The container is a virtualization technology that is created by packaging an application in an environment called a "container" and operates on a container engine. In a conventional container-based technology, abnormality detection and failure recovery for a container or an application operating on the container are implemented mainly by a Liveness/Readiness Probe function (also referred to as a probe function) to be described later of Kubernetes to be described later.

Kubernetes is container virtualization software that creates and clusters containers, such as Docker, and is open source software. The Liveness Probe function performs control such as restarting the container, and the Readiness Probe function performs control such as of whether or not the container receives a request. As this type of conventional technology, there is a technology described in Non Patent Literature 1.

CITATION LIST

Non Patent Literature

Non Patent Literature 1: "Configure Liveness, Readiness and Startup Probes," kubernetes, [online], [searched on Jun. 10, 2021], Internet <https://kubernetes.io/ja/docs/tasks/configure-pod-container/configure-liveness-readiness-startup-probes/>

SUMMARY OF INVENTION

Technical Problem

Meanwhile, not limited to the container described above, in a virtualization system as a virtualization technology area, recovery work or the like by human power is performed on a failure in the virtualization system on the basis of an alert issued. However, since the recovery work is performed by human power after the alert is issued, it is difficult to shorten the time from occurrence of the failure to normalization.

In a case where the failure is recovered by the probe function of Kubernetes, which performs failure recovery, a failure monitoring cycle can be set only to a predetermined slow cycle such as one second. For this reason, there has been a problem that, in a case where the failure recovery as soon as possible is required, the failure cannot be recovered earlier than the recovery by the failure recovery function of Kubernetes in a default state.

The present invention has been made in view of such circumstances, and an object thereof is to recover from a failure occurring in a virtualization system earlier than recovery by a failure recovery function of container virtualization software.

Solution to Problem

To solve the above problems, a virtualization system failure separation device of the present invention includes: a calculation resource cluster that is virtually created on a physical machine by container virtualization software and in which containers virtually created on the physical machine by the container virtualization software are clustered and arranged; a cluster management unit that is virtually created on the physical machine by the container virtualization software and manages control related to arrangement and operation of the containers clustered; an abnormality detection unit that is created at an outside of the calculation resource cluster and the cluster management unit that are virtually created and detects an abnormality in the containers; and an abnormality handling unit that is created at the outside and transmits, to the cluster management unit, a command for giving an instruction to stop an abnormal container detected by the abnormality detection unit, in which the cluster management unit stops the abnormal container in response to the command.

Advantageous Effects of Invention

According to the present invention, it is possible to recover from a failure occurring in a virtualization system earlier than recovery by a failure recovery function of container virtualization software.

DESCRIPTION OF EMBODIMENTS

Figure 1:
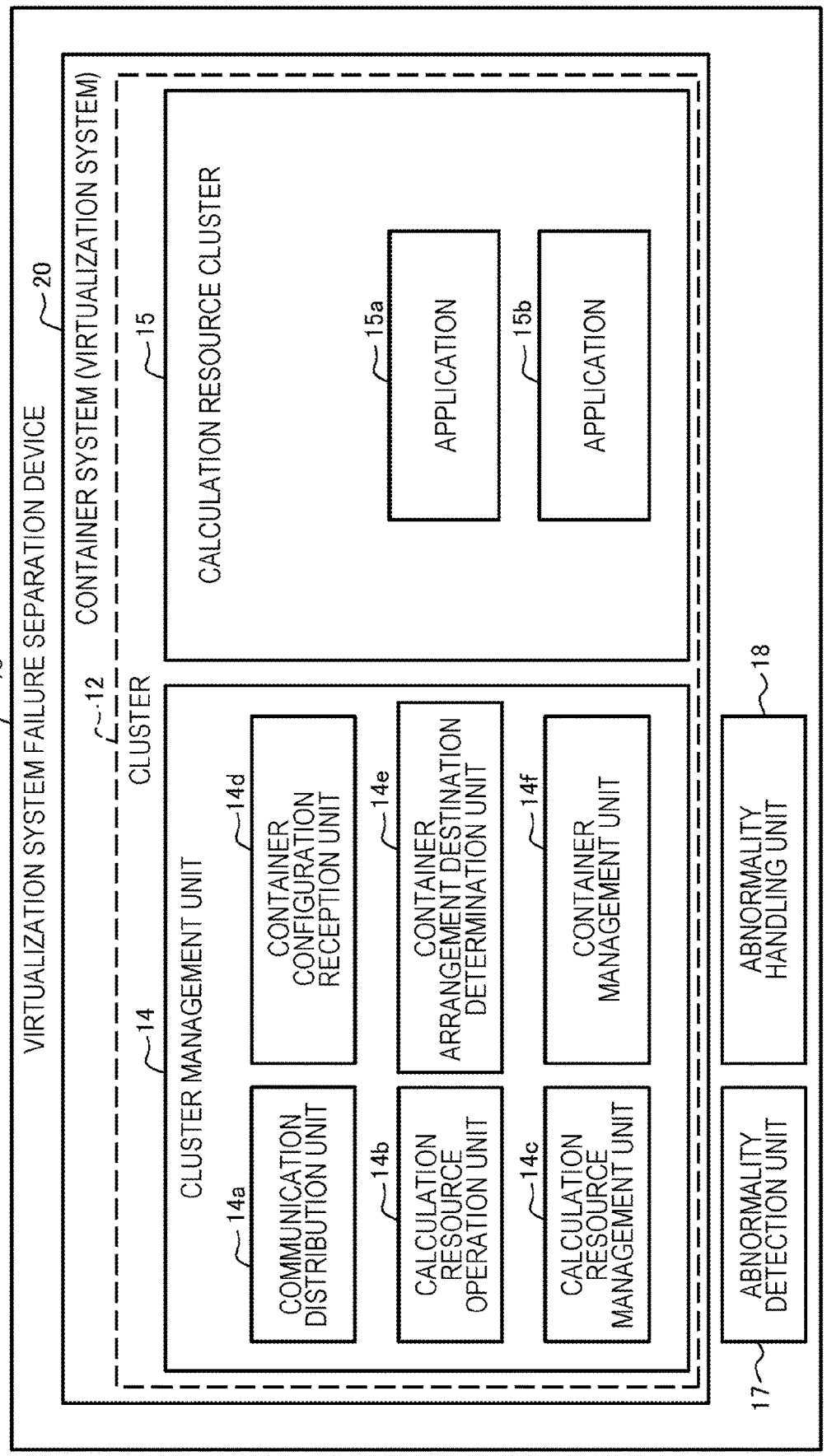
FIG. 1 is a block diagram illustrating a configuration of a virtualization system failure separation device according to an embodiment of the present invention.

Hereinafter, embodiments of the present invention will be described with reference to the drawings. However, in all the drawings in this specification, components having corresponding functions are denoted by the same reference numerals, and explanation of them will not be repeated as appropriate.

Configuration of Embodiment

FIG. 1 is a block diagram illustrating a configuration of a virtualization system failure separation device according to an embodiment of the present invention.

A virtualization system failure separation device (also referred to as a failure separation device) 10 illustrated in FIG. 1 stops or deletes and separates a container in which a failure in a container system 20 described later has occurred. The failure separation device 10 includes a cluster management unit 14, a calculation resource cluster 15, an abnormality detection unit 17, and an abnormality handling unit 18. The cluster management unit 14 and the calculation resource cluster 15 constitute a cluster 12. The abnormality detection unit 17 and the abnormality handling unit 18 are provided outside the cluster 12.

The calculation resource cluster 15 includes a plurality of applications 15a and 15b. In other words, the applications 15a and 15b are Pods as units of management of an aggregate of one or a plurality of containers. The Pod is a minimum unit of an application that can be executed by Kubernetes (container virtualization software). That is, containers are created and clustered by the applications 15a and 15b as the Pods, and this cluster is operated on a container engine. The calculation resource cluster 15 is virtually created on a physical machine by container virtualization software, and containers virtually created on the physical machine by the container virtualization software are clustered and arranged therein.

The container system 20 is a virtualization system including one or a plurality of clusters 12. In a case where there are two clusters 12, each cluster 12 includes the cluster management unit 14 and the calculation resource cluster 15.

The cluster management unit 14 is virtually created on the physical machine by the container virtualization software, and manages control related to arrangement and operation of the containers clustered. The cluster management unit 14 includes a communication distribution unit 14a, a calculation resource operation unit 14b, a calculation resource management unit 14c, a container configuration reception unit 14d, a container arrangement destination determination unit 14e, and a container management unit 14f.

In the failure separation device 10 having such a configuration, the abnormality detection unit 17 detects an abnormality in the Pods (applications) 15a and 15b that are one or a plurality of containers in the container system 20. The abnormality handling unit 18 stops the Pod (for example, the Pod 15a) in which an abnormality is detected by the abnormality detection unit 17, and notifies the communication distribution unit 14a of a command as request information for operating only the normal Pod 15b.

The communication distribution unit 14a is a router, and performs distribution and notification of a command from the abnormality handling unit 18 or a request depending on the command to the corresponding units 14b to 14f.

The container configuration reception unit (also referred to as a reception unit) 14d receives configuration information for deploying (arranging) a container in the calculation resource cluster 15 from an external server or the like.

The container arrangement destination determination unit (also referred to as an arrangement destination determination unit) 14e determines which container is arranged in which worker node (calculation resource cluster 15) on the basis of the configuration information received by the reception unit 14d.

The container management unit 14f checks whether or not the container is normally operating.

The calculation resource management unit 14c grasps and manages whether or not a worker node is operable, a use amount of a calculation resource of a server constituting the worker node, a remaining amount of a central processing unit (CPU), and the like.

The calculation resource operation unit 14b performs an operation of allocating a predetermined amount of calculation resources such as a certain amount of CPU to a certain container, in other words, an operation of allocating a storage capacity, a CPU time, a memory capacity available to the container, and the like.

Next, various types of abnormality detection processing (first to sixth abnormality detection processing) related to the container of the container system 20 by the abnormality detection unit 17 of the failure separation device 10 will be described with reference to FIGS. 2 to 7.

<First Abnormality Detection Processing>

Figure 2:
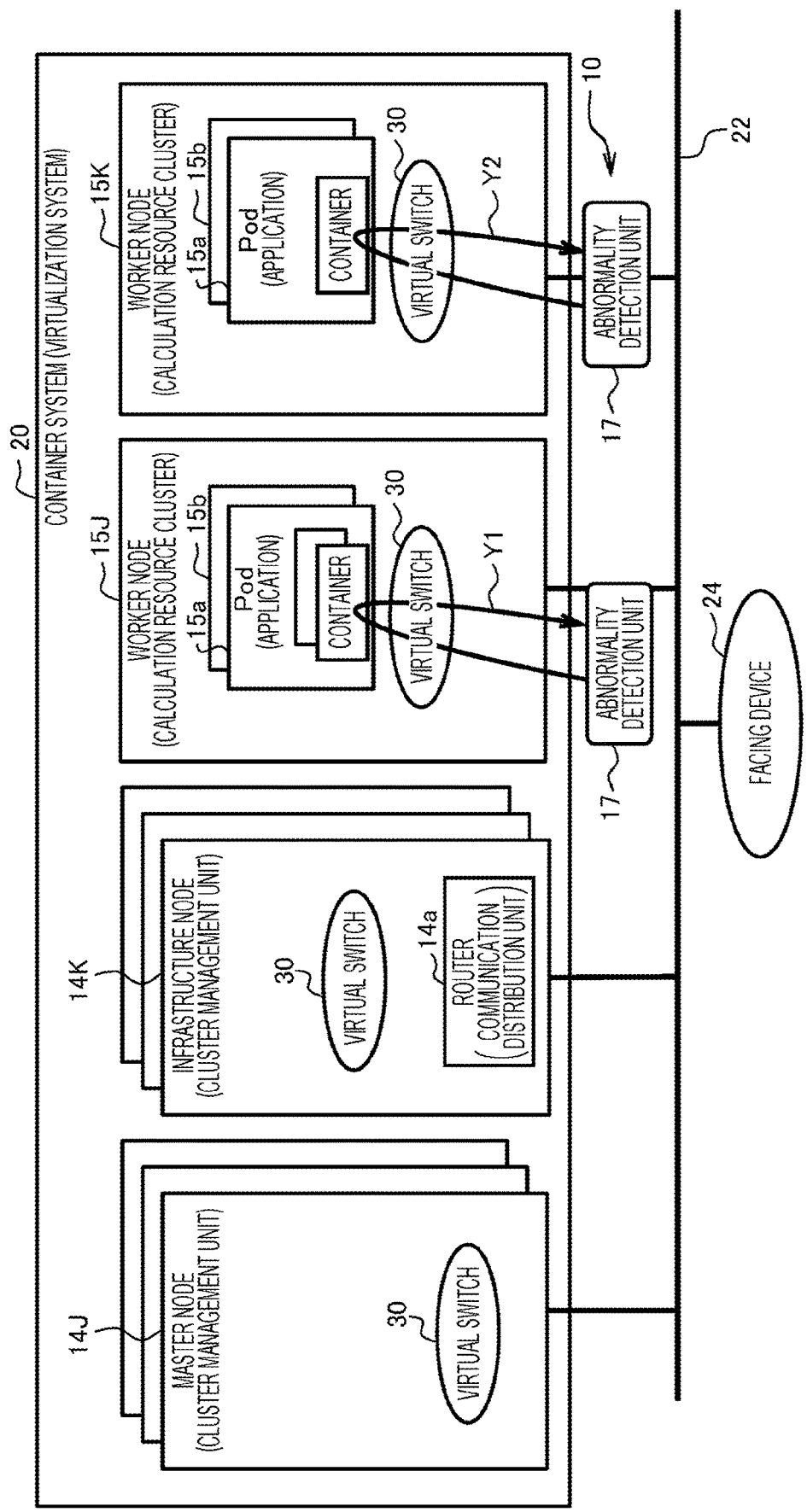
FIG. 2 is a block diagram for explaining first abnormality detection processing for containers by Pods of the virtualization system failure separation device of the present embodiment.

FIG. 2 is a block diagram for explaining first abnormality detection processing for containers by the Pods (applications) 15a and 15b of the virtualization system failure separation device 10 of the present embodiment. However, the Pods 15a and 15b constitute one or a plurality of containers.

In FIG. 2, in the container system 20, a master node 14J, an infrastructure node 14K, and worker nodes 15J and 15K are configured by a virtual machine, and are connected to each other by respective virtual switches {Open vSwitches (OVSs)} 30. The master node 14J and the infrastructure node 14K correspond to the cluster management unit 14 (FIG. 1), and the worker nodes 15J and 15K correspond to the calculation resource cluster 15 (FIG. 1).

Further, the master node 14J and the worker node 15J constitute a first cluster 12, and the infrastructure node 14K and the worker node 15K constitute a second cluster 12. It is assumed that the container system 20 includes these clusters 12.

The abnormality detection unit 17 is arranged outside the container system 20 similarly to the configuration of FIG. 1. In FIG. 2, a total of two abnormality detection units 17 are illustrated for the respective worker nodes 15J and 15K, but the number of abnormality detection units 17 may be one. The master node 14J, the infrastructure node 14K, the worker nodes 15J and 15K, and the abnormality detection units 17 are connected to a facing device 24 via a network 22. The facing device 24 is a communication device such as an external server that transmits a request signal and the like to the container system 20.

The abnormality detection unit 17 transmits a predetermined command (for example, "sudo crictl ps") to the Pods 15a and 15b of the worker nodes 15J and 15K by polling indicated by reciprocating arrows Y1 and Y2, and determines whether there is an abnormality or not depending on response results returned from the Pods 15a and 15b in response to the command. In this polling actual test, the average value of round-trip times when polling was executed 10 times was 0.06 seconds.

Abnormality determination in the abnormality detection unit 17 is performed by reading a character string indicating normal or abnormal described in the command response results returned from the Pods 15a and 15b by polling. For example, a character string "Running" indicates that operation of a container (Pod 15a, 15b) is normal, and a character string other than "Running" indicates that the operation is abnormal. For this reason, the abnormality detection unit 17 determines that the operation of the container (Pod 15a, 15b) is normal in a case where "Running" is described in the command response result, and determines that the operation is abnormal in a case where a character string other than "Running" is described.

<Second Abnormality Detection Processing>

Figure 3:
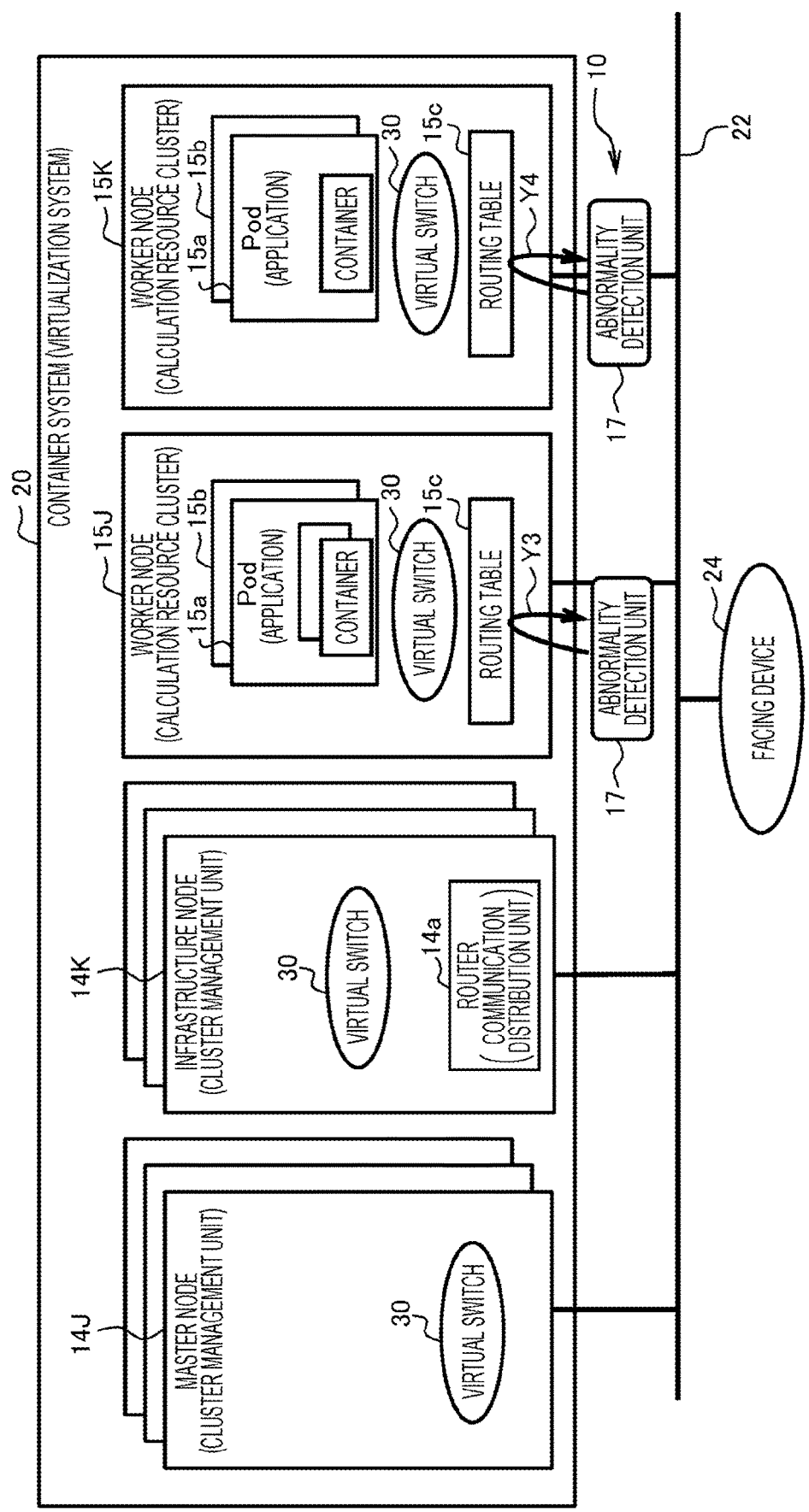
FIG. 3 is a block diagram for explaining second abnormality detection processing using a routing table provided for each of worker nodes of the virtualization system failure separation device of the present embodiment.

Next, FIG. 3 is a block diagram for explaining second abnormality detection processing using a routing table 15c provided for each of the worker nodes 15J and 15K of the virtualization system failure separation device 10 of the present embodiment.

The routing table (also referred to as a table) 15c manages containers of transmission destinations of packets transmitted from the facing device 24 to the Pods 15a and 15b of the worker nodes 15J and 15K via the network 22 with route information indicating the transmission destinations. If transmission destination management of the table 15c is incorrect, the packet does not reach an appropriate container. For this reason, the abnormality detection unit 17 detects whether the transmission destination management of the table 15c is normal or abnormal.

However, the routing table 15c includes a pair of tables "iptables" and "nftables".

The abnormality detection unit 17 transmits a predetermined command to the tables 15c of the respective worker nodes 15J and 15K by polling indicated by reciprocating arrows Y3 and Y4, and determines whether there is an abnormality or not depending on response results returned from the tables 15c in response to the command.

The predetermined command is a pair of "sudo iptables -L|wc-|" and "sudo nft list ruleset". Notification of the command "sudo iptables -L|wc-|" is performed to "iptables" of the table 15c, and notification of the command "sudo nft list ruleset" is performed to "nftables". Then, each table of "iptables" and "nftables" returns a response depending on the command to the abnormality detection unit 17.

In the polling actual test by a pair of commands, the average value of round-trip times when polling was executed 10 times was 0.03 seconds in a case of the command "sudo iptables -L|wc-|" and 0.08 seconds in a case of the command "sudo nft list ruleset".

In the abnormality determination in the abnormality detection unit 17, it is determined that there is no abnormality if the route information of the transmission destination is described in the command response result returned from each table 15c, and it is determined that there is an abnormality if nothing is described.

<Third Abnormality Detection Processing>

Figure 4:
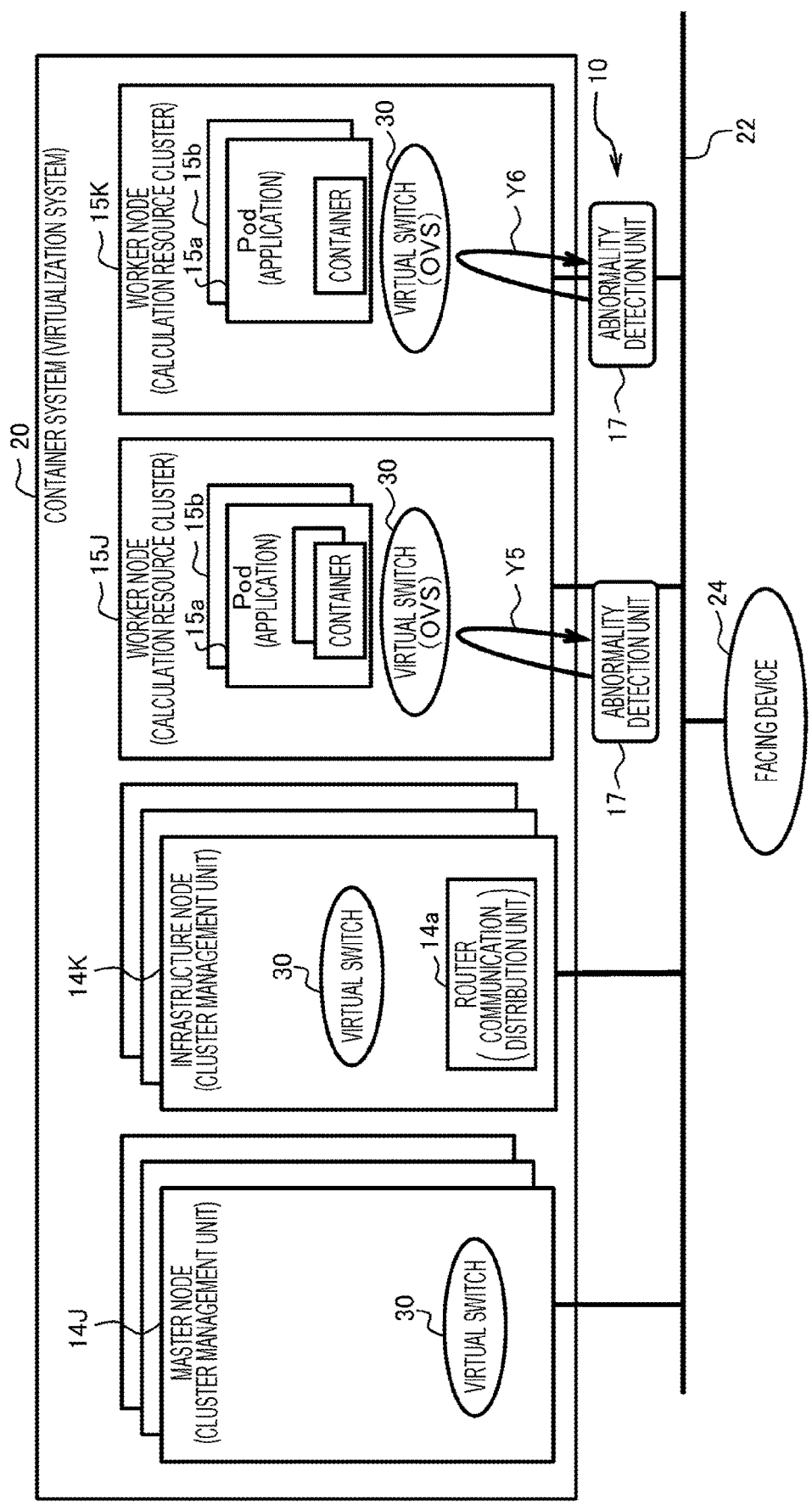
FIG. 4 is a block diagram for explaining third abnormality detection processing by monitoring a daemon of a virtual switch provided for each worker node of the virtualization system failure separation device of the present embodiment.

Next, FIG. 4 is a block diagram for explaining third abnormality detection processing by monitoring a daemon of a virtual switch 30 provided for each of the worker nodes 15J and 15K of the virtualization system failure separation device 10 of the present embodiment. The daemon of the virtual switch 30 is also referred to as an OVS daemon.

The daemon is a program for managing a transmission destination of a packet in the virtual switch 30. The abnormality detection unit 17 monitors the OVS daemon, and detects that there is no abnormality if the packet is properly transmitted, and detects that there is an abnormality if the packet is not properly transmitted.

The abnormality detection unit 17 transmits a predetermined command (for example, "ps aux|grep ovs-vswitch-d|grep "db.sock"|wc–|") to the virtual switches 30 for the respective worker nodes 15J and 15K by polling indicated by reciprocating arrows Y5 and Y6, and determines whether there is an abnormality or not depending on response results returned from the virtual switches 30 in response to the command.

In this polling actual test, the average value of the round-trip time when polling was executed 10 times was 0.03 seconds.

In the abnormality determination in the abnormality detection unit 17, it is determined that there is no abnormality if, for example, "db.sock process" related to the transmission destination is described in the command response result returned from each virtual switch 30, and it is determined that there is an abnormality if not described.

<Fourth Abnormality Detection Processing>

Figure 5:
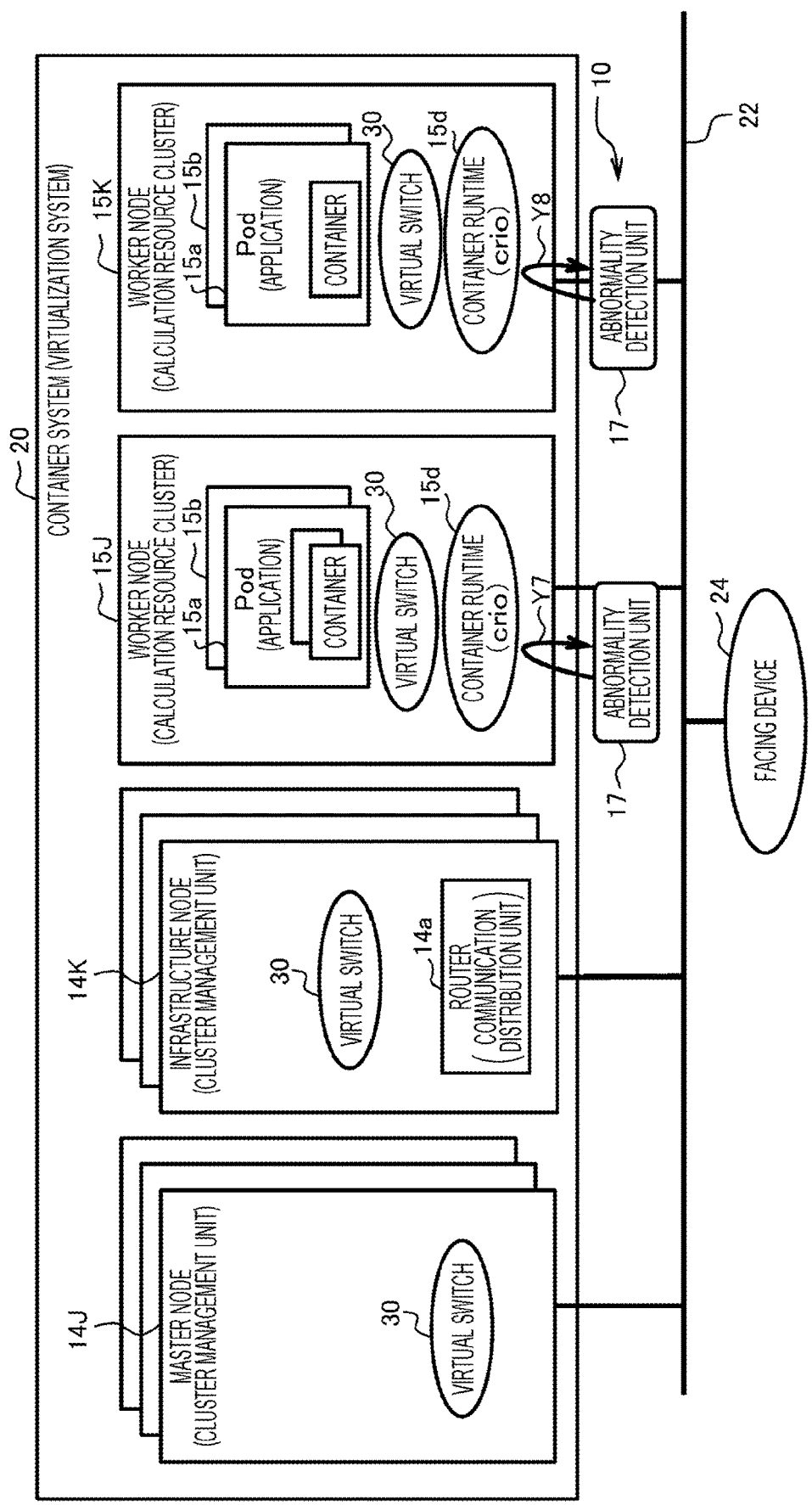
FIG. 5 is a block diagram for explaining fourth abnormality detection processing by monitoring a daemon of a container runtime provided for each worker node of the virtualization system failure separation device of the present embodiment.

Next, FIG. 5 is a block diagram for explaining fourth abnormality detection processing by monitoring a daemon of a container runtime 15d provided for each of the worker nodes 15J and 15K of the virtualization system failure separation device 10 of the present embodiment. Note that the daemon of the container runtime 15d is also referred to as a crio daemon. Crio (cri-o) is an open source, community driven container engine used in container virtualization technology.

Since the container runtime 15d plays a role of activating the containers of the Pod 15a and 15b, it is possible to detect whether or not the containers are normally activated by monitoring the container runtime 15d. Thus, the abnormality detection unit 17 monitors the crio daemon, and detects that there is no abnormality if the container is activated, and detects that there is an abnormality if the container is not activated.

The abnormality detection unit 17 transmits a predetermined command (for example, "systemctl status crio|grep Active") to the container runtimes 15d of the respective worker nodes 15J and 15K by polling indicated by reciprocating arrows Y7 and Y8, and determines whether there is an abnormality or not depending on response results returned from the container runtimes 15d in response to the command.

In this polling actual test, the average value of the round-trip time when polling was executed 10 times was 0.03 seconds.

In the abnormality determination in the abnormality detection unit 17, if "active (running)" indicating an activation state of the crio daemon is described in the command response result returned from each virtual switch 30, it is determined that there is no abnormality, and if the description is other than "active (running)", it is determined that there is an abnormality.

<Fifth Abnormality Detection Processing>

Figure 6:
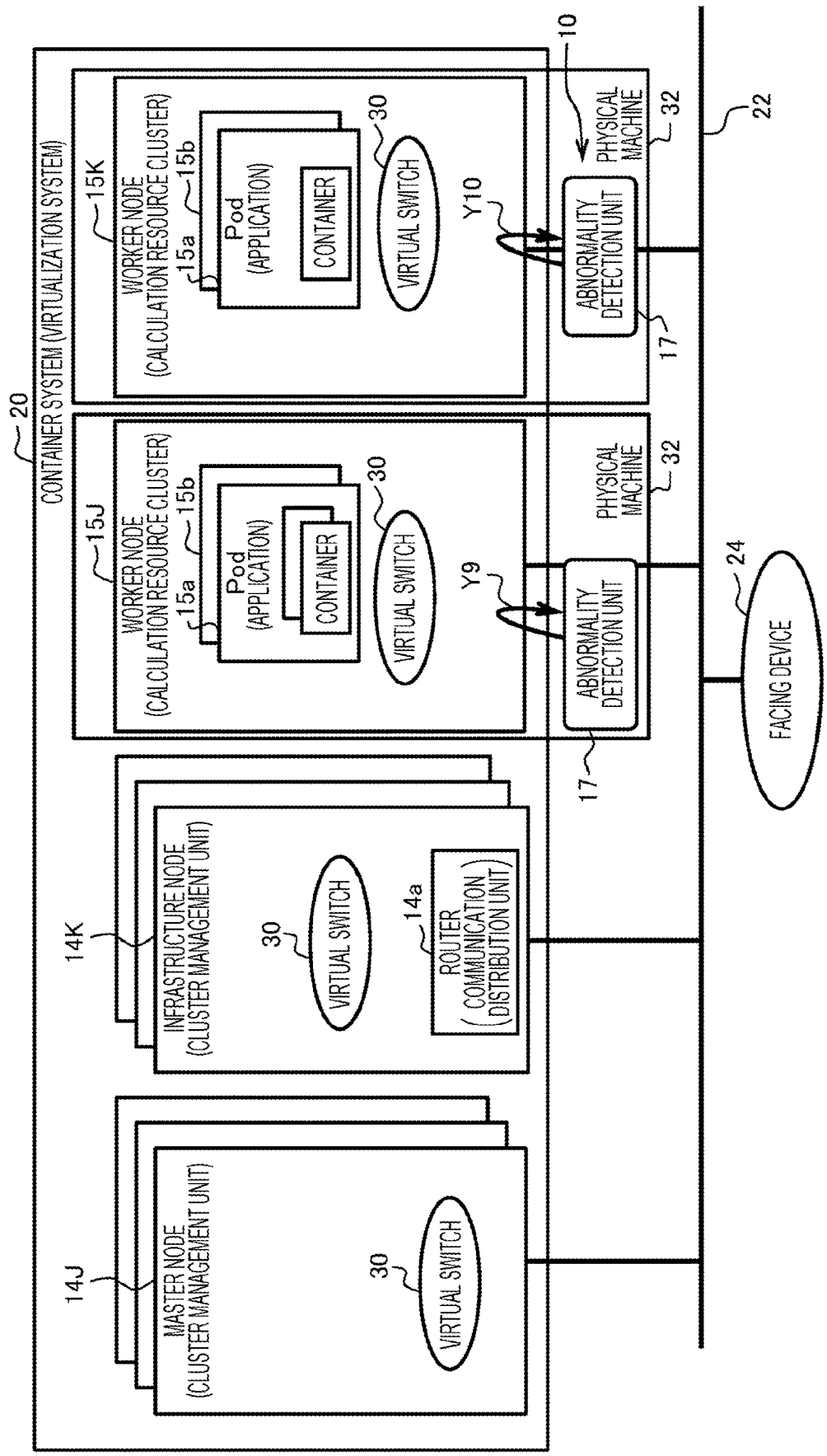
FIG. 6 is a block diagram for explaining fifth abnormality detection processing by monitoring each worker node of the virtualization system failure separation device of the present embodiment.

Next, FIG. 6 is a block diagram for explaining fifth abnormality detection processing by monitoring each of the worker nodes 15J and 15K of the virtualization system failure separation device 10 of the present embodiment.

However, a configuration is assumed in which the worker nodes 15J and 15K are created by a virtualization technology (virtual machine) using a physical machine 32. In this configuration, the abnormality detection unit 17 exists on the physical machine 32 outside the virtual machine, and the abnormality detection unit 17 detects that the container is normal if the virtual machine is activated, and detects that the container is abnormal if the virtual machine is not activated.

The abnormality detection unit 17 transmits a predetermined command (for example, "sudo virsh list") to the worker nodes 15J and 15K by polling indicated by reciprocating arrows Y9 and Y10, and determines whether there is an abnormality or not depending on response results returned from the worker nodes 15J and 15K in response to the command.

In this polling actual test, the average value of the round-trip time when polling was executed 10 times was 0.03 seconds.

In the abnormality determination in the abnormality detection unit 17, it is determined that there is no abnormality if "Running" indicating an activation state of the target worker nodes 15J and 15K is described in the command response results returned from the worker nodes 15J and 15K, and it is determined that there is an abnormality if the description is other than "Running".

<Sixth Abnormality Detection Processing>

Figure 7:
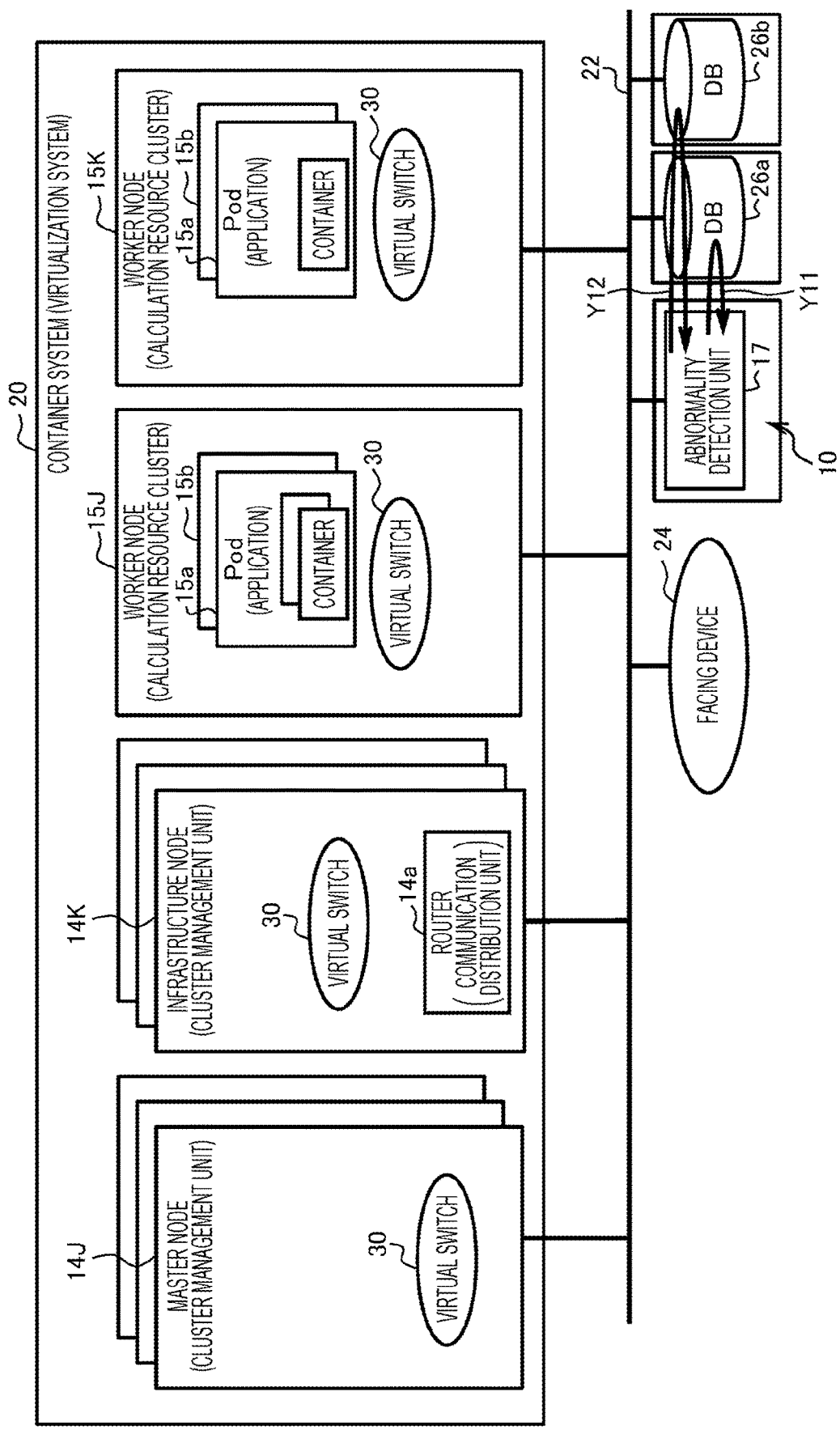
FIG. 7 is a block diagram for explaining sixth abnormality detection processing by monitoring DBs externally attached to a cluster of a container system of the virtualization system failure separation device of the present embodiment.

Next, FIG. 7 is a block diagram for explaining sixth abnormality detection processing by monitoring data bases (DBs) 26a and 26b externally attached to the cluster 12 of the container system 20 of the virtualization system failure separation device 10 of the present embodiment.

There is a configuration in which the DBs (also referred to as external DBs) 26a and 26b that store data related to the containers are connected, as external devices of the cluster 12 (FIG. 1), to worker nodes 15J and 15K via the network 22. At this time, the abnormality detection unit 17 is also connected to the worker nodes 15J and 15K via the network 22.

Here, since there is also a configuration in which a plurality of clusters 12 is connected to each other via the network 22, even if the abnormality detection unit 17 is connected to the cluster 12 via the network 22 as illustrated in FIG. 7, it is placed as the abnormality detection unit 17 in the failure separation device 10 as illustrated in FIG. 1.

The abnormality detection unit 17 transmits a predetermined command to the external DBs 26a and 26b via the network 22 by polling indicated by reciprocating arrows Y11 and Y12, and determines whether there is an abnormality or not depending on response results returned from the external DBs 26a and 26b in response to the command. The command in this case depends on types of the external DBs 26a and 26b.

The response result includes a result related to response/activation monitoring and a result related to an excess of an upper limit of the number of connections. The response/activation monitoring monitors whether or not the external DBs 26a and 26b are normally activated. That is, the abnormality detection unit 17 determines that there is an abnormality if the response result describes contents that the external DBs 26a and 26b are not normally activated.

The excess of the upper limit of the number of connections indicates that the number of containers to which the external DBs 26a and 26b are connected exceeds a predetermined threshold value. That is, the abnormality detection unit 17 determines that there is an abnormality if the response result describes that the number of connected containers of the external DBs 26a and 26b exceeds the threshold value.

In this polling actual test, the polling round-trip time depends on the types of the external DBs 26a and 26b.

Next, abnormality handling processing at the time of first to fourth and sixth abnormality detection described above will be described with reference to FIGS. 8 to 11.

<First Abnormality Handling Processing>

Figure 8:
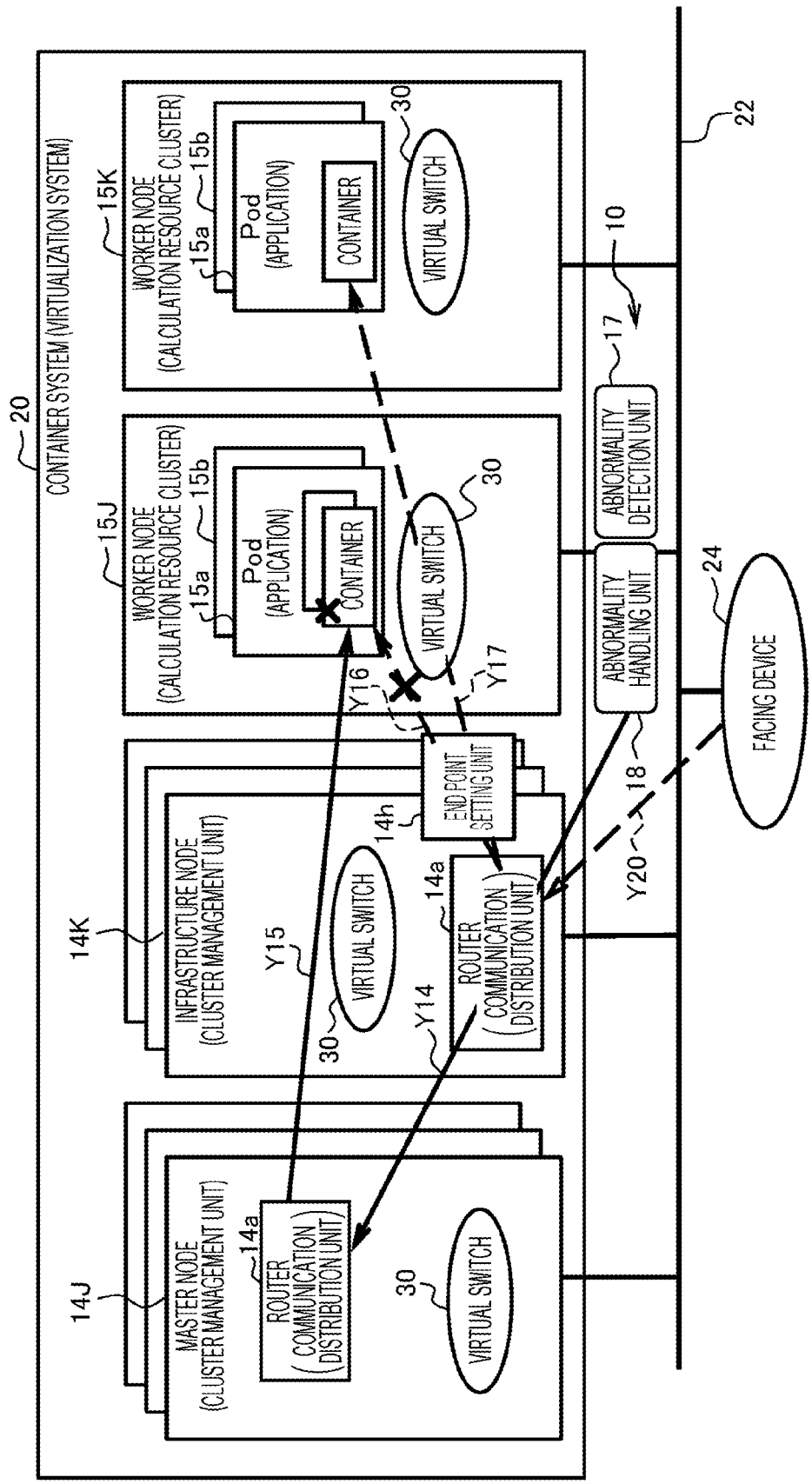
FIG. 8 is a block diagram for explaining first abnormality handling processing performed by the virtualization system failure separation device of the present embodiment.

FIG. 8 is a block diagram for explaining first abnormality handling processing performed by the virtualization system failure separation device 10 of the present embodiment. It is assumed that the abnormality detection that requires the first abnormality handling processing is any one of the first to fourth and sixth abnormality detection.

When the abnormality detection unit 17 illustrated in FIG. 8 detects an abnormality, the abnormality handling unit 18 performs the first abnormality handling processing as follows. In this abnormality handling processing, labels are assigned to the Pods 15a and 15b in advance. In the labels, information (label value) is described for enabling or disabling (disabling) access of a request to the Pods 15a and 15b. The label value can be changed by being rewritten to access-possible or access-impossible by the router 14a of the master node 14J.

Notification of the request is performed by the router (communication distribution unit) 14a of the infrastructure node 14K to the Pods 15a and 15b for each of the worker nodes 15J and 15K via an end point setting unit 14h. The end point setting unit 14h receives service information related to communication indicated by an arrow Y20 from the facing device 24, and is shared by the plurality of Pods 15a and 15b of each of the worker nodes 15J and 15K.

In a case where the label values of the Pods 15a and 15b are access-possible, the Pods 15a and 15b can receive the request and perform communication and the like. On the other hand, in a case where the label values are access-impossible, the Pods 15a and 15b cannot receive the request, and thus communication and the like cannot be performed.

As described above, in a configuration in which the end point setting unit 14h and the Pods 15a and 15b form a one-to-N relationship, at the time of detection of the abnormality by the abnormality detection unit 17, the label value of the abnormal Pod 15a is changed to a value (access-impossible) different from an access setting (for example, access-possible) to the Pods 15a and 15b via the end point setting unit 14h, whereby communication to the abnormal Pod 15a can be inhibited.

Next, operation of the first abnormality handling processing will be described with reference to FIG. 8 and a flowchart illustrated in FIG. 9. As a precondition, it is assumed that the label values of the Pods 15a and 15b for each of the worker nodes 15J and 15K are set to access-possible.

Figure 9:
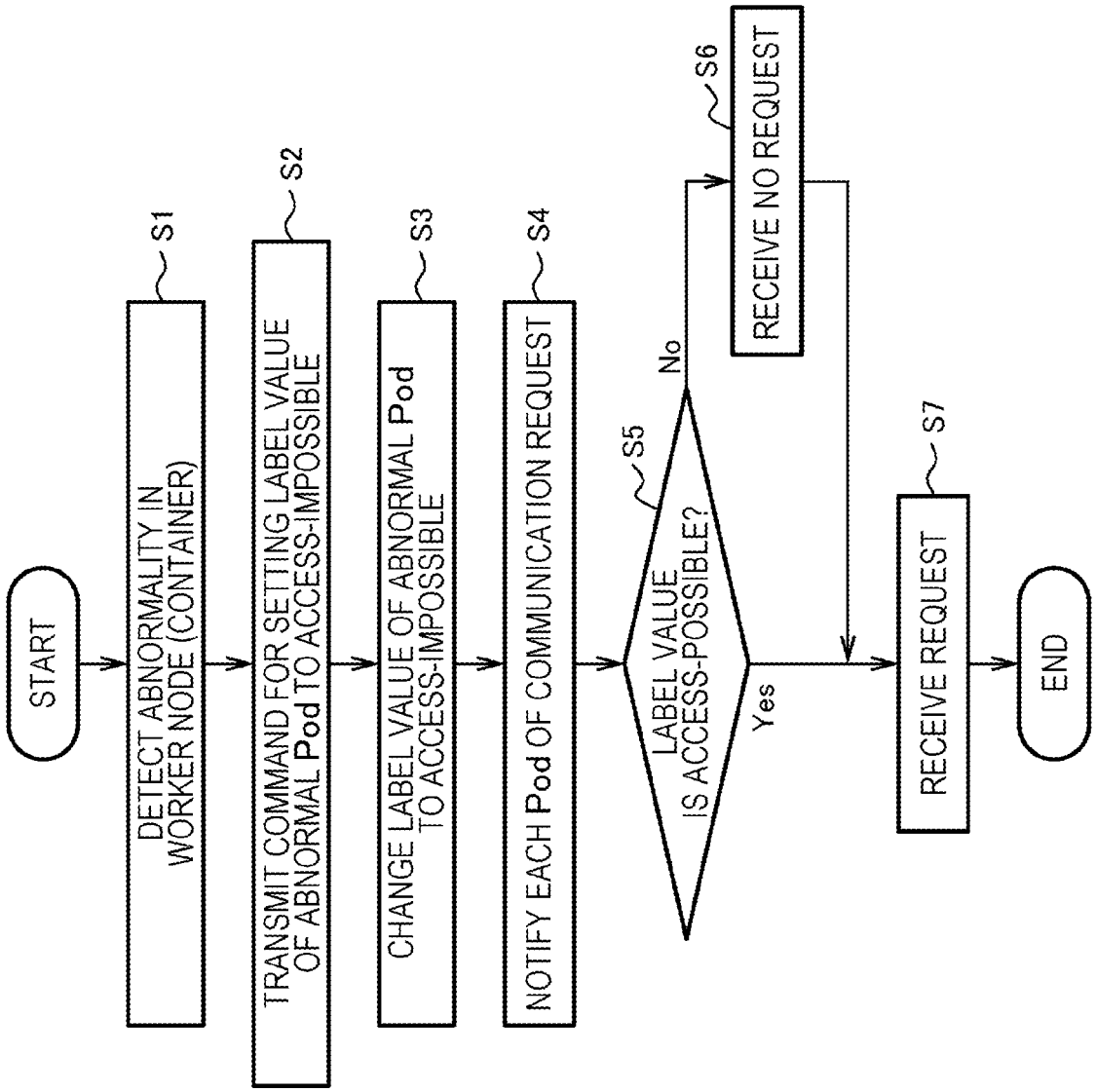
FIG. 9 is a flowchart for explaining operation of the first abnormality handling processing.

In step S1 illustrated in FIG. 9, it is assumed that an abnormality in the Pod 15a of the worker node 15J is detected by the abnormality detection unit 17 illustrated in FIG. 8.

At the time of detection of the abnormality, in step S2, as indicated by an arrow Y14, the abnormality handling unit 18 transmits a command (for example, "oc label pod name lb=label value —overwrite=true") for setting the label value of the abnormal Pod 15a to access-impossible to the router 14a of the master node 14J.

In step S3, the router 14a that has received the command changes the label value of the abnormal Pod 15a to access-impossible as indicated by an arrow Y15.

Here, regarding an execution time until the change of the label value of the abnormal Pod 15a after transmission of the command from the abnormality handling unit 18, the average value of the execution times when the command is transmitted 10 times was 0.38 seconds.

In step S4, after the label change in step S3, the router 14a of the infrastructure node 14K notifies the Pod 15a for each of the worker nodes 15J and 15K of a communication request via the end point setting unit 14h as indicated by arrows Y16 and Y17.

Here, in step S5, it is determined whether or not the label value of the Pod 15a for each of the worker nodes 15J and 15K is access-possible.

It is assumed that the abnormal Pod 15a of the worker node 15J is notified of the request in step S4 as indicated by the arrow Y16. In this case, since the label value is set to access-impossible, it is determined in step S5 that the label value is not access-possible (access-impossible) (No).

In this case, in step S6, the abnormal Pod 15a cannot receive the request as indicated by a cross mark, so that communication and the like of the abnormal Pod 15a becomes impossible. In other words, the abnormal Pod 15a is in a stopped state and is separated from the normal Pod 15b.

On the other hand, it is assumed that the Pod 15a of the worker node 15K is notified of the request in step S4 as indicated by the arrow Y17. In this case, since the label value is set to access-possible, it is determined in step S5 that the label value is access-possible (Yes).

In this case, in step S7, the Pod 15a of the worker node 15K receives the request, and communication and the like becomes possible.

<Second Abnormality Handling Processing>

Figure 10:
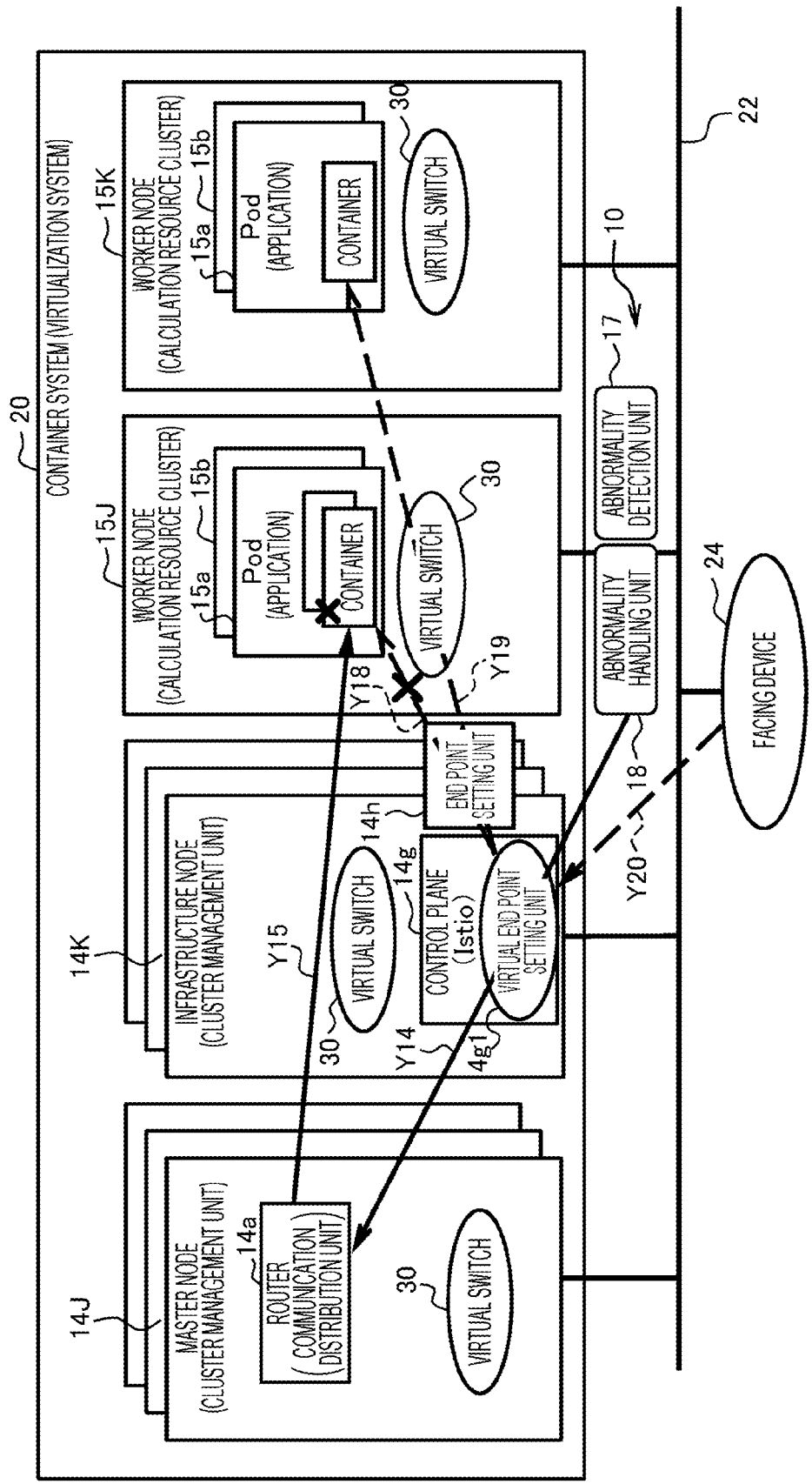
FIG. 10 is a block diagram for explaining second abnormality handling processing performed by the virtualization system failure separation device of the present embodiment.

FIG. 10 is a block diagram for explaining second abnormality handling processing performed by the virtualization system failure separation device 10 of the present embodiment. It is assumed that the abnormality detection that requires the second abnormality handling processing is any one of the first to fourth and sixth abnormality detection. Further, it is assumed that the second abnormality handling processing is abnormality handling processing at the time of detection of the abnormality in the container is detected in an Istio environment (described later).

Here, the plurality of applications 15a and 15b of the calculation resource cluster 15 (FIG. 1) are referred to as a component. The component has a function of a proxy that performs relay communication. Note that, in yet other words, the component is also the plurality of Pods 15a, 15b or the plurality of containers.

The Istio environment refers to an environment in which a component is operated, and is implemented by a control plane (also referred to as a plane) 14g provided in the infrastructure node 14K illustrated in FIG. 10. The plane 14g includes a virtual end point setting unit 4g1. The virtual end point setting unit 4g1 is obtained by virtually configuring an end point setting unit in the plane 14g, has a function similar to that of the end point setting unit 14h (FIG. 8), and is shared by the plurality of Pod 15a and 15b of each of the worker nodes 15J and 15K.

In addition, in the Istio environment, various functions are implemented in combination with a proxy called "Envoy" operating on a container. In the Istio environment, Envoy processing, management of collected data, service monitoring, and the like are performed. It is Envoy that actually performs work mediating communication between microservices in the Istio environment. Istio performs processing of setting and managing operation of Envoy and acquiring information of network traffic indicated by the arrow Y20 from the facing device 24 via Envoy.

In a case where the abnormality detection unit 17 detects an abnormality in the container, the abnormality handling unit 18 performs the second abnormality handling processing. That is, if an abnormality in the Pod 15a of the worker node 15J is detected by the abnormality detection unit 17, the abnormality handling unit 18 transmits a command (for example, "oc label pod Pod name lb=label value —overwrite=true") for setting the label of the abnormal Pod 15a to access-impossible to the router 14a of the master node 14J, as indicated by the arrow Y14. Upon receiving the command, the router 14a changes the label of the abnormal Pod 15a to access-impossible as indicated by the arrow Y15.

Here, regarding an execution time until the change of the label of the abnormal Pod 15a after transmission of the command from the abnormality handling unit 18, the average value of the execution times when the command is transmitted 10 times was 0.38 seconds.

After the label change, the plane 14g of the infrastructure node 14K notifies the Pod 15a of each of the worker nodes 15J and 15K of a communication request via the virtual end point setting unit 4g1 as indicated by arrows Y18 and Y19. At this time, the abnormal Pod 15a in which the label value of the worker node 15J is set to access-impossible cannot be accessed as indicated by a cross mark. For this reason, the abnormal Pod 15a is in a stopped state and is separated from the normal Pod 15b.

As described above, the Istio environment of the plane 14g is used, and in a configuration in which the virtual end point setting unit 4g1 and the Pods 15a and 15b form a one-to-N relationship, at the time of detection of the abnormality by the abnormality detection unit 17, the label value of the abnormal Pod 15a is changed to a value (access-impossible) different from an access setting (for example, access-possible) to the Pods 15a and 15b via the virtual end point setting unit 4g1. Accordingly, communication to the abnormal Pod 15a can be inhibited.

<Third Abnormality Handling Processing>

Figure 11:
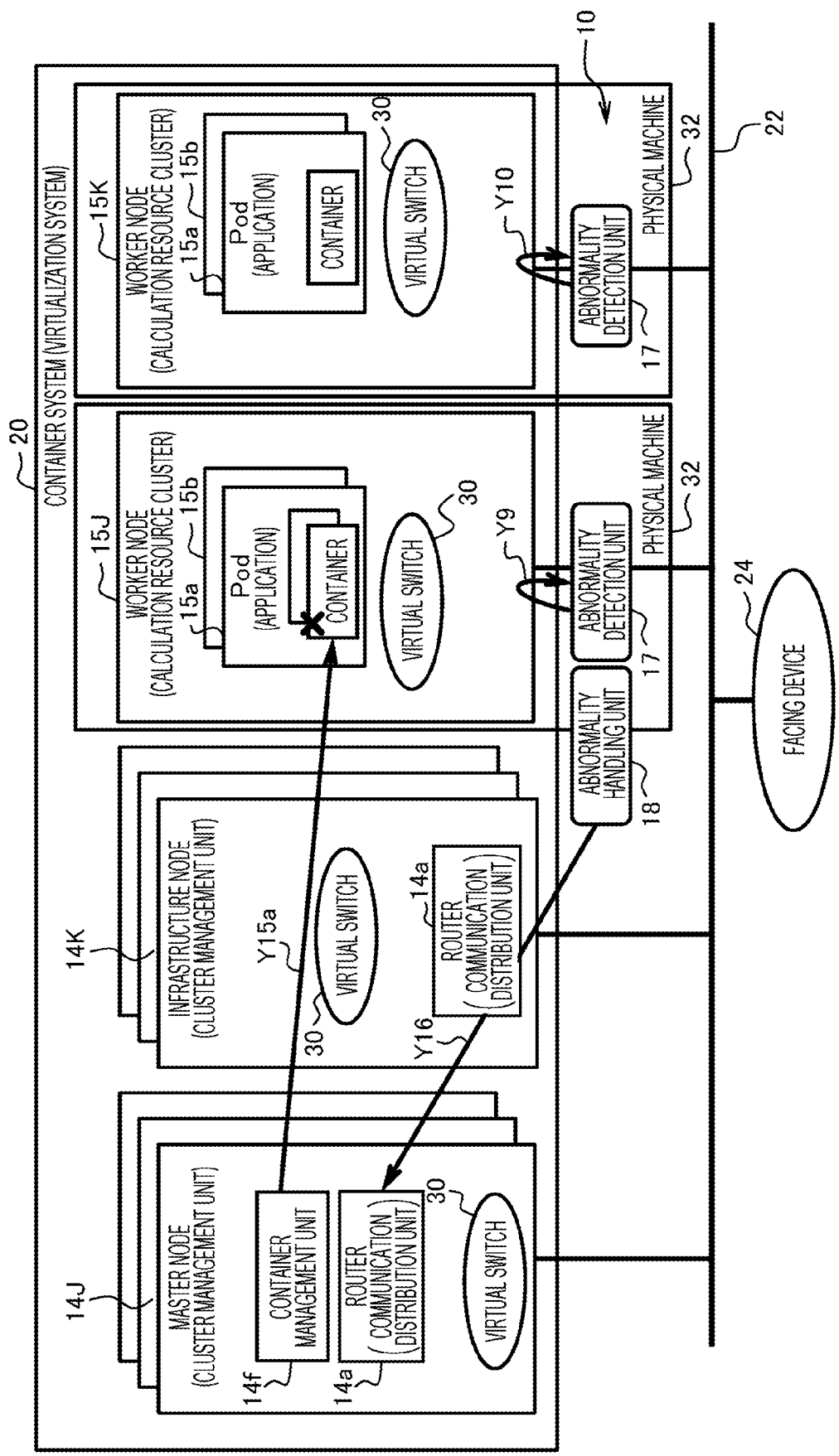
FIG. 11 is a block diagram for explaining third abnormality handling processing performed by the virtualization system failure separation device of the present embodiment.

FIG. 11 is a block diagram for explaining third abnormality handling processing performed by the virtualization system failure separation device 10 of the present embodiment. It is assumed that the abnormality detection that requires the third abnormality handling processing is the fifth abnormality detection.

In the third abnormality handling processing, as a precondition, a label indicating a belonging node is assigned to the Pods 15a and 15b for each of the worker nodes 15J and 15K by polling by the container management unit 14f.

It is assumed that the abnormality detection unit 17 on the physical machine 32 detects an abnormality in, for example, the worker node 15J that is a virtual machine as indicated by the arrow Y9. At this time, the label of the Pod 15a is also detected.

Next, as indicated by the arrow Y16, the abnormality handling unit 18 transmits, to the router 14a of the master node 14J, a command (for example, "oc delete pod -1 node label designation —grace-period 0—force") for forcibly deleting the Pod 15a to which a label of the worker node 15J supporting abnormality detection is assigned. At the time of transmitting the command, the label information of the abnormal Pod 15a is also transmitted.

The router 14a notifies the container management unit 14f of the received command. As indicated by an arrow Y15a, the container management unit 14f forcibly deletes (cross mark) the abnormal Pod 15a of the worker node 15J indicated by the label information of the command. Since the forced deletion is immediately executed, it is possible to perform earlier the restart of the Pod 15a corresponding to the abnormal Pod 15a.

<Fourth Abnormality Handling Processing>

Figure 12:
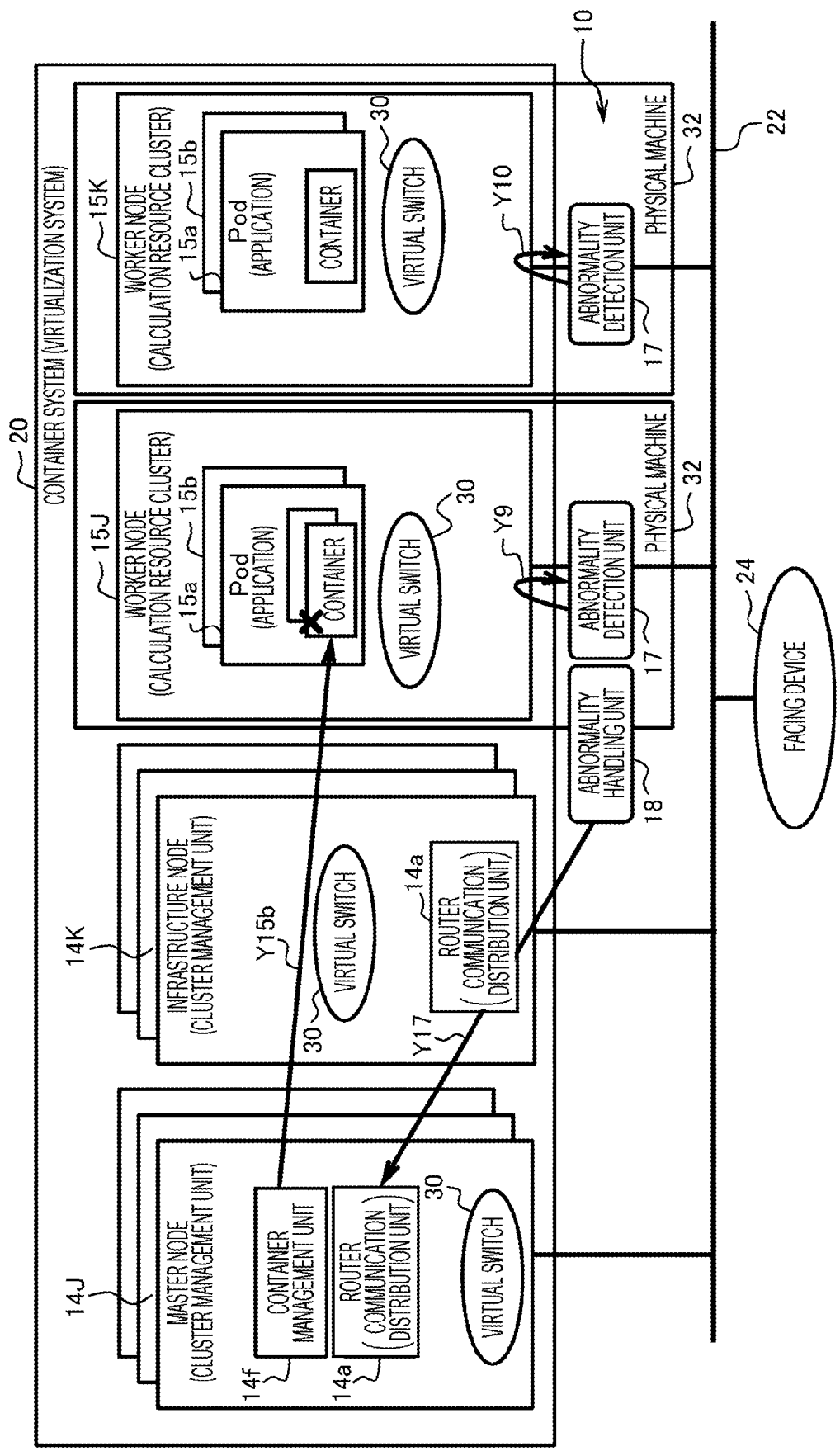
FIG. 12 is a block diagram for explaining fourth abnormality handling processing performed by the virtualization system failure separation device of the present embodiment.

FIG. 12 is a block diagram for explaining fourth abnormality handling processing performed by the virtualization system failure separation device 10 of the present embodiment. It is assumed that the abnormality detection that requires the fourth abnormality handling processing is the fifth abnormality detection.

It is assumed that the abnormality detection unit 17 on the physical machine 32 detects an abnormality in, for example, the worker node 15J that is a virtual machine as indicated by the arrow Y9. In this case, as indicated by the arrow Y17, the abnormality handling unit 18 transmits, to the router 14a of the master node 14J, a command (for example, "oc adm drain node name —delete-local-data —ignore-daemonsets —grace-period 0") for forcibly deleting all the Pods 15a of the worker node 15J in which an abnormality has been detected.

The router 14a notifies the container management unit 14f of the received command. As indicated by an arrow Y15b, the container management unit 14f forcibly deletes (cross mark) all the Pods 15a of the worker node 15J indicated by the command. After the forced deletion, the Pods 15a corresponding to all the deleted Pods 15a are restarted in another node (for example, the worker node 15K).

<Hardware Configuration>

Figure 13:
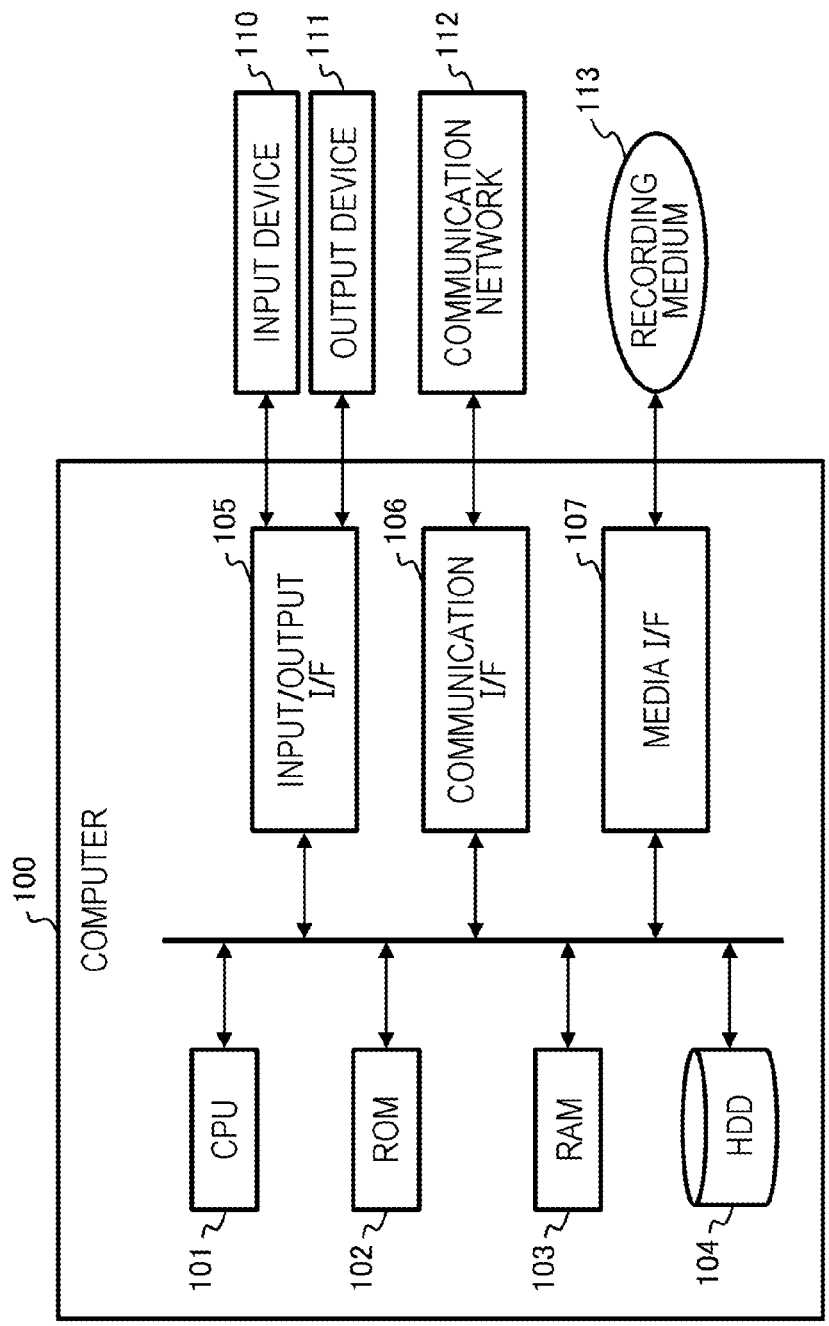
FIG. 13 is a hardware configuration diagram illustrating an example of a computer that implements functions of the virtualization system failure separation device according to the present embodiment.

The virtualization system failure separation device 10 according to the embodiment described above is implemented by, for example, a computer 100 having a configuration as illustrated in FIG. 13. The computer 100 includes a central processing unit (CPU) 101, a read only memory (ROM) 102, a random access memory (RAM) 103, a hard disk drive (HDD) 104, an input/output interface (I/F) 105, a communication I/F 106, and a media I/F 107.

The CPU 101 operates on the basis of a program stored in the ROM 102 or the HDD 104, and controls each of functional units. The ROM 102 stores a boot program executed by the CPU 101 at the time of starting the computer 100, a program related to hardware of the computer 100, and the like.

The CPU 101 controls an output device 111 such as a printer and a display and an input device 110 such as a mouse and a keyboard via the input/output I/F 105. The CPU 101 acquires data from the input device 110 or outputs generated data to the output device 111 via the input/output I/F 105.

The HDD 104 stores a program executed by the CPU 101, data used by the program, and the like. The communication I/F 106 receives data from another device (not illustrated) via a communication network 112 and outputs the data to the CPU 101, and transmits the data generated by the CPU 101 to another device via the communication network 112.

The media I/F 107 reads a program or data stored in a recording medium 113, and outputs the program or data to the CPU 101 via the RAM 103. The CPU 101 loads a program related to target processing from the recording medium 113 on the RAM 103 via the media I/F 107, and executes the loaded program. The recording medium 113 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, in a case where the computer 100 functions as the virtualization system failure separation device 10 according to the embodiment, the CPU 101 of the computer 100 implements functions of the virtualization system failure separation device 10 by executing the program loaded on the RAM 103. In addition, data in the RAM 103 is stored in the HDD 104. The CPU 101 reads a program related to target processing from the recording medium 113 and executes the program. In addition to this, the CPU 101 may read a program related to target processing from another device via the communication network 112.

Effects of Embodiment

Effects of the virtualization system failure separation device 10 according to the embodiment of the present invention will be described.

(1a) The failure separation device 10 includes: the calculation resource cluster 15 that is virtually created on a physical machine by container virtualization software and clusters and arranges containers virtually created on the physical machine by the container virtualization software; and the cluster management unit 14 that is virtually created and manages control related to arrangement and operation of the clustered containers (Pods 15a and 15b). Further, included are: an abnormality detection unit 17 that is created at an outside of the calculation resource cluster 15 and the cluster management unit 14 that are virtually created and detects an abnormality in the containers; and an abnormality handling unit 18 that is created at the outside and transmits, to the cluster management unit 14, a command for giving an instruction to stop an abnormal container detected by the abnormality detection unit 17. The cluster management unit 14 is configured to stop the abnormal container in response to the command.

According to this configuration, when a container failure occurs, the abnormality detection unit 17 and the abnormality handling unit 18 are arranged outside the virtualization component in the container virtualization software that creates the container. The abnormality detection unit 17 detects the abnormality in the container, and the abnormality handling unit 18 transmits the command at the time of stopping the detected abnormal container to the cluster management unit 14. The cluster management unit 14 stops the abnormal container in response to the command.

Since the abnormality detection unit 17 and the abnormality handling unit 18 are not involved in the container virtualization software, recovery can be performed earlier than recovery by the failure recovery function for containers of the container virtualization software. Further explaining a reason why the recovery can be performed earlier, in the above-described failure recovery function, the failure monitoring cycle can be set only to a predetermined cycle, but in the present invention, regardless of the monitoring cycle, the failure in the container can be detected and the abnormal container can be stopped. For this reason, it is possible to perform recovery earlier than the recovery by the failure recovery function.

(2a) The end point setting unit 14h is included that acquires service information related to communication from the facing device 24 that performs communication via the network 22 and is shared by the plurality of containers in the calculation resource cluster 15. The cluster management unit 14 is configured to access a request to the plurality of containers via the end point setting unit 14h. In this configuration, a label in which a label value of any one of access-possible and access-impossible that enables or disable access of the request from the cluster management unit 14 is described is assigned to the clustered container. The abnormality handling unit 18 transmits a command for giving an instruction to set the label value of the abnormal container detected by the abnormality detection unit 17 to access-impossible to the cluster management unit 14. The cluster management unit 14 is configured to change the label value of the abnormal container indicated in the command to access-impossible.

According to this configuration, the label with the label value of access-possible or access-impossible is assigned to the container, and the label value of the abnormal container detected by the abnormality detection unit 17 is changed to access-impossible. For this reason, when the cluster management unit 14 accesses the request to the abnormal container via the end point setting unit 14h, access cannot be made. In other words, the abnormal container is in a stopped state and is separated from the normal container.

(3a) The cluster management unit 14 includes a virtual end point setting unit that is virtually created and integrates data of a plurality of containers of the calculation resource cluster 15 to monitor the containers, and the cluster management unit 14 is configured to access a request to the plurality of containers via the virtual end point setting unit. In this configuration, a label in which a label value of any one of access-possible and access-impossible that enables or disable access of the request from the cluster management unit 14 is described is assigned to the clustered container. The abnormality handling unit 18 transmits a command for giving an instruction to set the label value of the abnormal container detected by the abnormality detection unit 17 to access-impossible to the cluster management unit 14. The cluster management unit 14 is configured to change the label value of the abnormal container indicated in the command to access-impossible.

According to this configuration, the label with the label value of access-possible or access-impossible is assigned to the container, and the label value of the abnormal container detected by the abnormality detection unit 17 is changed to access-impossible. For this reason, when the cluster management unit 14 accesses the request to the abnormal container via the virtual end point setting unit, access cannot be made. In other words, the abnormal container is in a stopped state and is separated from the normal container.

(4a) The abnormality detection unit 17 and the abnormality handling unit 18 are created on the physical machine. A label indicating the calculation resource cluster 15 to which the container belongs is assigned to the clustered container. The abnormality detection unit 17 detects that the container is normal if the virtually created calculation resource cluster 15 is activated, and detects that the container is abnormal if the virtually created calculation resource cluster is stopped. The abnormality handling unit 18 transmits a command for giving an instruction to forcibly delete the detected abnormal container and label information of the abnormal container to the cluster management unit 14. The cluster management unit 14 is configured to forcibly delete the abnormal container indicated by the label information in response to the instruction of the command.

According to this configuration, after the abnormality in the calculation resource cluster 15 is detected, search is performed for a container to which the label of the detected abnormal calculation resource cluster 15 is assigned using the label information, and the container is forcibly deleted immediately. For this reason, the restart of the abnormal container can be performed earlier.

(5a) The abnormality detection unit 17 and the abnormality handling unit 18 are created on the physical machine. The abnormality detection unit 17 detects that the container is normal if the virtually created calculation resource cluster 15 is activated, and detects that the container is abnormal if the virtually created calculation resource cluster is stopped. The abnormality handling unit 18 transmits a command for giving an instruction to forcibly delete all the containers of the detected calculation resource cluster 15 to the cluster management unit 14. The cluster management unit 14 is configured to forcibly delete all the containers of the calculation resource cluster 15 according to the command and restart the containers corresponding to all the deleted containers in another calculation resource cluster 15.

According to this configuration, after the abnormality in the calculation resource cluster 15 is detected, all the containers of the detected abnormal calculation resource cluster 15 are immediately and forcibly deleted, and all the deleted containers are restarted in another calculation resource cluster 15. Thus, it is possible to perform earlier the restart of all the containers deleted after the abnormality is detected.

Effects (1) A virtualization system failure separation device is characterized by including: a calculation resource cluster that is virtually created on a physical machine by container virtualization software and in which containers virtually created on the physical machine by the container virtualization software are clustered and arranged; a cluster management unit that is virtually created on the physical machine by the container virtualization software and manages control related to arrangement and operation of the containers clustered; an abnormality detection unit that is created at an outside of the calculation resource cluster and the cluster management unit that are virtually created and detects an abnormality in the containers; and an abnormality handling unit that is created at the outside and transmits, to the cluster management unit, a command for giving an instruction to stop an abnormal container detected by the abnormality detection unit, in which the cluster management unit stops the abnormal container in response to the command.

According to this configuration, when a container failure occurs, the abnormality detection unit and the abnormality handling unit are arranged outside the virtualization component in the container virtualization software that creates the container. The abnormality detection unit detects the abnormality in the container, and the abnormality handling unit transmits the command at the time of stopping the detected abnormal container to the container management unit. The container management unit stops the abnormal container in response to the command. Since the abnormality detection unit and the abnormality handling unit are not involved in the container virtualization software, recovery can be performed earlier than recovery by the failure recovery function for containers of the container virtualization software. Further explaining a reason why the recovery can be performed earlier, in the above-described failure recovery function, the failure monitoring cycle can be set only to a predetermined cycle, but in the present invention, regardless of the monitoring cycle, the failure in the container can be detected and the abnormal container can be stopped. For this reason, it is possible to perform recovery earlier than the recovery by the failure recovery function.

(2) The virtualization system failure separation device according to (1) is characterized in that in a configuration including an end point setting unit that acquires service information related to communication from a facing device that performs communication via a network and is shared by a plurality of containers in the calculation resource cluster, in which the cluster management unit accesses a request to the plurality of containers via the end point setting unit, a label is assigned to the containers clustered, the label describing a label value of either access-possible for enabling access of a request from the cluster management unit or access-impossible for disabling the access, the abnormality handling unit transmits, to the cluster management unit, a command for giving an instruction to set the label value of the abnormal container detected by the abnormality detection unit to access-impossible, and the cluster management unit changes the label value of the abnormal container indicated in the command to access-impossible.

According to this configuration, the label with the label value of access-possible or access-impossible is assigned to the container, and the label value of the abnormal container detected by the abnormality detection unit is changed to access-impossible. For this reason, when the cluster management unit accesses the request to the abnormal container via the end point setting unit, access cannot be made. In other words, the abnormal container is in a stopped state and is separated from the normal container.

(3) The virtualization system failure separation device according to (1) is characterized in that in a configuration in which the cluster management unit includes a virtual end point setting unit that is virtually created on the physical machine by the container virtualization software, and integrates data of a plurality of containers of the calculation resource cluster and monitors the containers, and the cluster management unit accesses a request to the plurality of containers via the virtual end point setting unit, a label is assigned to the containers clustered, the label describing a label value of either access-possible for enabling access of a request from the cluster management unit or access-impossible for disabling the access, the abnormality handling unit transmits, to the cluster management unit, a command for giving an instruction to set the label value of the abnormal container detected by the abnormality detection unit to access-impossible, and the cluster management unit changes the label value of the abnormal container indicated in the command to access-impossible.

According to this configuration, the label with the label value of access-possible or access-impossible is assigned to the container, and the label value of the abnormal container detected by the abnormality detection unit is changed to access-impossible. For this reason, when the cluster management unit accesses the request to the abnormal container via the virtual end point setting unit, access cannot be made. In other words, the abnormal container is in a stopped state and is separated from the normal container.

(4) The virtualization system failure separation device according to (1) is characterized in that the abnormality detection unit and the abnormality handling unit are created on the physical machine, a label is assigned to the containers clustered, the label indicating the calculation resource cluster to which the containers belong, the abnormality detection unit detects that the containers are normal when the calculation resource cluster virtually created is activated, and detects that the containers are abnormal when the calculation resource cluster virtually created is stopped, the abnormality handling unit transmits, to the cluster management unit, a command for giving an instruction to forcibly delete the abnormal container detected, and label information of the abnormal container, and the cluster management unit forcibly deletes the abnormal container indicated by the label information in response to the instruction of the command.

According to this configuration, after the abnormality in the calculation resource cluster is detected, search is performed for a container to which the label of the detected abnormal calculation resource cluster is assigned using the label information, and the container is forcibly deleted immediately. For this reason, the restart of the abnormal container can be performed earlier.

(5) The virtualization system failure separation device according to (1) is characterized in that the abnormality detection unit and the abnormality handling unit are created on the physical machine, the abnormality detection unit detects that the containers are normal when the calculation resource cluster virtually created is activated, and detects that the containers are abnormal when the calculation resource cluster virtually created is stopped, the abnormality handling unit transmits, to the cluster management unit, a command for giving an instruction to forcibly delete all containers of the calculation resource cluster detected, and the cluster management unit forcibly deletes all the containers of the calculation resource cluster according to the command, and restarts containers corresponding to all the containers deleted in another calculation resource cluster.

According to this configuration, after the abnormality in the calculation resource cluster is detected, all the containers of the detected abnormal calculation resource cluster are immediately and forcibly deleted, and all the deleted containers are restarted in another calculation resource cluster. Thus, it is possible to perform earlier the restart of all the containers deleted after the abnormality is detected.

In addition to the above, the specific configuration can be modified as appropriate, without departing from the scope of the present invention.

REFERENCE SIGNS LIST 10 virtualization system failure separation device
14 cluster management unit
14a communication distribution unit
14b calculation resource operation unit
14c calculation resource management unit
14d container configuration reception unit
14e container arrangement destination determination unit
14f container management unit
15 calculation resource cluster
15a, 15b application
17 abnormality detection unit
18 abnormality handling unit

The invention claimed is:

1. A virtualization system failure separation device comprising:
 a calculation resource cluster that is virtually created on a physical machine by container virtualization software and in which containers virtually created on the physical machine by the container virtualization software are clustered and arranged;
 a cluster management virtual machine that is virtually created on the physical machine by the container virtualization software and configured to manage control related to arrangement and operation of the containers;
 an abnormality detector that is operating independently of both the calculation resource cluster and the cluster management virtual machine and is configured to transmit, to the calculation resource cluster, a first command polling the containers, receive a first command response including a character string from each of the containers, and detect an abnormality in the containers based on a content of the character string; and
 an abnormality handler that is operating independently of both the calculation resource cluster and the cluster management virtual machine and is configured to transmit, to the cluster management virtual machine, a second command for giving an instruction to stop an abnormal container detected by the abnormality detector, wherein
 the cluster management virtual machine is configured to stop the abnormal container in response to the second command.

2. The virtualization system failure separation device according to claim 1, further comprising
 an end point setting virtual machine configured to acquire service information related to communication from a communication device configured to perform communication via a network and is shared by the containers in the calculation resource cluster, wherein the cluster management virtual machine is configured to access a request to the plurality of containers via the end point setting virtual machine,
 wherein a label is assigned to each of the containers, the label describing a label value of either access-possible for enabling access of the request from the cluster management virtual machine or access-impossible for disabling the access,
 the abnormality handler is configured to transmit, to the cluster management virtual machine, a third command for giving an instruction to set the label value of the abnormal container detected by the abnormality detector to access-impossible, and
 the cluster management virtual machine is configured to change the label value of the abnormal container indicated in the third command to access-impossible.

3. The virtualization system failure separation device according to claim 1, wherein
 the cluster management virtual machine includes a end point setting virtual machine that is virtually created on the physical machine by the container virtualization software and is configured to acquire service information related to communication from a communication device configured to perform communication via a network, is shared by the containers in the calculation resource cluster, and monitor the containers, and the cluster management virtual machine is configured to access a request to the containers via the end point setting virtual machine,
 wherein a label is assigned to each of the containers, the label describing a label value of either access-possible for enabling access of a request from the cluster management virtual machine or access-impossible for disabling the access,
 the abnormality handler is configured to transmit, to the cluster management virtual machine, a third command for giving an instruction to set the label value of the abnormal container detected by the abnormality detector to access-impossible, and
 the cluster management virtual machine is configured to change the label value of the abnormal container indicated in the third command to access-impossible.

4. The virtualization system failure separation device according to claim 1, wherein
 the abnormality detector and the abnormality handler are created on the physical machine,
 the abnormality detector is configured to detect that the containers are normal when the calculation resource cluster is activated, and detect that the containers are abnormal when the calculation resource cluster is stopped,
 the abnormality handler is configured to transmit, to the cluster management virtual machine, a third command for giving an instruction to forcibly delete the abnormal container, and
 the cluster management virtual machine is configured to forcibly delete the abnormal container in response to the instruction of the third command.

5. The virtualization system failure separation device according to claim 1, wherein
 the abnormality detector and the abnormality handler are created on the physical machine,
 the abnormality detector is configured to detect that the containers are normal when the calculation resource cluster is activated, and detect that the containers are abnormal when the calculation resource cluster is stopped,
 the abnormality handler is configured to transmit, to the cluster management virtual machine, a third command for giving an instruction to forcibly delete all containers of the calculation resource cluster, and
 the cluster management virtual machine is configured to forcibly delete all the containers of the calculation resource cluster according to the third command, and restart containers corresponding to all the deleted containers in another calculation resource cluster.

6. A virtualization system failure separation method by a virtualization system failure separation device, comprising:
 clustering and arranging, on a calculation resource cluster virtually created on a physical machine by container virtualization software, containers virtually created on the physical machine by the container virtualization software;
 virtually creating, on the physical machine by the container virtualization software, a cluster management virtual machine that manages control related to arrangement and operation of the containers;
 transmitting, by an abnormality detector operating separately from the calculation resource cluster and the cluster management virtual machine, a first command polling the containers to the calculation resource cluster;
 receiving, by the abnormality detector, a first command response including a character string from each of the containers;

detecting, by the abnormality detector operating independently of both the calculation resource cluster and the cluster management virtual machine, an abnormality in the containers based on a content of the character string;
transmitting, by an abnormality handler operating independently of both the calculation resource cluster and the cluster management virtual machine, a second command for giving an instruction to stop a detected abnormal container to the cluster management virtual machine; and
stopping, using the cluster management virtual machine, the detected abnormal container in response to the second command.

* * * * *